United States Patent [19]

Tyrell et al.

[11] Patent Number: 4,595,733
[45] Date of Patent: Jun. 17, 1986

[54] AROMATIC POLYCARBONATE CONTAINING THIENO-2-ONE-5,5-DIOXIDE TERMINAL GROUPS

[75] Inventors: John A. Tyrell; Gary L. Freimiller, both of Mt. Vernon, Ind.

[73] Assignee: General Electric Company, Mt. Vernon, Ind.

[21] Appl. No.: 650,866

[22] Filed: Sep. 14, 1984

[51] Int. Cl.$^4$ .............................................. C08G 63/62
[52] U.S. Cl. ................................. 525/462; 525/439; 525/445; 525/468; 528/198
[58] Field of Search .............. 525/462, 468, 439, 445; 528/198

[56] References Cited

U.S. PATENT DOCUMENTS 3,028,365  4/1962  Schnell et al. ...................... 528/196
3,989,672  11/1976  Vestergaard ........................ 528/196

Primary Examiner—Harold D. Anderson
Attorney, Agent, or Firm—Myron B. Kapsutij; Martin B. Barancik

[57] ABSTRACT

Polymers containing at least one terminal group represented by the general formula

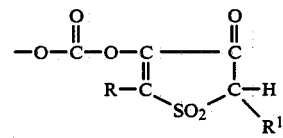

wherein R and $R^1$ are independently selected from hydrogen and monovalent hydrocarbon radicals.

13 Claims, No Drawings

AROMATIC POLYCARBONATE CONTAINING THIENO-2-ONE-5,5-DIOXIDE TERMINAL GROUPS

BACKGROUND OF THE INVENTION

The importance of end-capping or terminating certain aromatic polymers such as, for example, polycarbonates, copolyester-carbonates, polyesters, phenolics, polyphenylene ethers, and the like, with certain end or terminal groups is well known. These aromatic polymers which are not end-capped are in general not sufficiently thermally stable since the free phenolic hydroxyl end groups present in these polymers provide reactive sites which are usually detrimental to the stability of the polymers. Known end-capping agents include the phenolic compounds such as phenol itself, p-tertiarybutyl phenol, and chroman-I.

The prior art further discloses other types of compounds that function as effective end-capping agents for certain of these aromatic polymers such as polycarbonates. These end-capping agents include the alkanol amines disclosed in U.S. Pat. No. 3,085,922; the imides disclosed in U.S. Pat. No. 3,399,172; aniline and methyl aniline as disclosed in U.S. Pat. No. 3,275,601; and the primary and secondary amines as disclosed in U.S. Pat. No. 4,001,184. Other end-capping agents include the aromatic amines disclosed in U.S. Pat. No. 3,028,365; and the ammonium compounds, amonia, primary cycloalkyl amines, and primary aliphatic or aralkyl amines as disclosed in U.S. Pat. No. 4,111,910.

However, according to Schnell, *Chemistry and Physics of Polycarbonates* (1964), Interscience Publishers, New York, N.Y., page 183, ammonium hydroxide and amines saponify polycarbonates back to the monomers. This is supported by Bolgiano, U.S. Pat. No. 3,223,678, which discloses that small amounts of amines such as monoethanolamine and morpholine break or degrade polycarbonates into lower molecular weight polycarbonates. Thus, this area of chemistry is generally not fully understood and is one where the empirical approach is still generally the method used to determine whether a particular compound or class of compounds will function as effective terminal groups or end-capping agents for the aromatic polymers. This area is further complicated by the fact that even though a particular compound may function as a terminal group for these aromatic polymers, its presence in the polymer chain may adversely affect the advantageous mechanical properties of the polymer.

SUMMARY OF THE INVENTION

The instant invention is directed to aromatic polymers containing at least one terminal group represented by the general formula

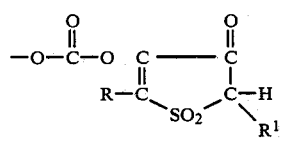

wherein R and $R^1$ are independently selected from hydrogen and monovalent hydrocarbon radicals.

DESCRIPTION OF THE INVENTION

In accordance with the instant invention there are provided aromatic polymers which contain at least one terminal group represented by the general formula

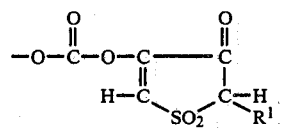

wherein R and $R^1$ are independently selected from hydrogen and monovalent hydrocarbon radicals.

The monovalent hydrocarbon radicals represented by R and $R^1$ are selected from alkyl radicals, cycloalkyl radicals, aryl radicals, aralkyl radicals, and alkaryl radicals.

The alkyl radicals may be straight chain alkyl radicals or branched alkyl radicals. Preferred alkyl radicals are those containing from 1 to about 12 carbon atoms. Some illustrative non-limiting examples of these preferred alkyl radicals include methyl, ethyl, propyl, isopropyl, butyl, tertiarybutyl, pentyl, neopentyl, hexyl, octyl, and the like.

The preferred cycloalkyl radicals are those containing from 4 to about 8 ring carbon atoms. Some illustrative non-limiting examples of these preferred cycloalkyl radicals include cyclobutyl, cyclopentyl, cyclohexyl, methylcyclohexyl, and cycloheptyl.

The preferred aryl radicals represented by R and $R^1$ are those containing from 6 to 12 ring carbon atoms. These preferred aryl radicals include phenyl, naphthyl, and biphenyl. The aryl radicals may also be substituted aryl radicals. The preferred substituent groups are the alkyl, preferably the lower alkyl, groups.

The preferred aralkyl and alkaryl radicals are those containing from 7 to about 14 carbon atoms.

Preferably, R and $R^1$ are independently selected from monovalent hydrocarbon radicals. The preferred monovalent hydrocarbon radicals are aryl and alkaryl radicals.

Some illustrative non-limiting examples of the terminal groups represented by Formula I are set forth in Table I.

TABLE I

| R | $R^1$ |
|---|---|
| —CH₃ | —CH₃ |
| —C₂H₅ | —C₄H₉ |
|  |  |
|  |  |
|  | —CH₂—CH(CH₃)—CH₃ |
|  | —CH₂—CH₂—C(CH₃)₂—CH₂—CH₃ |

TABLE I-continued

| R | R¹ |
|---|---|
| 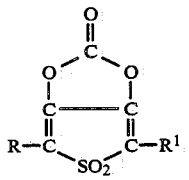 | |
| 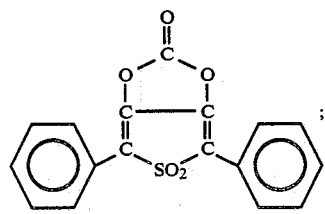 | |

The aromatic polymers containing at least one terminal group of Formula I will generally exhibit improved thermal stability and improved heat aging characteristics relative to aromatic polymers containing terminal phenolic hydroxyl terminal groups.

A number of different methods may be used to prepare the polymers of the instant invention. For example, high molecular weight aromatic polymers containing terminal phenolic hydroxyl groups may be prepared by conventional well known processes. After these aromatic polymers are formed they may be reacted with an end-capping amount of an end-capping agent described hereinafter to form the aromatic polymers containing at least one terminal or end-group of Formula I. Alternatively, the aromatic polymers containing at least one terminal group of Formula I may be prepared by including as one of the reactants an end-capping or terminating amount of at least one of the end-capping agents described hereinafter in the polymer forming reaction.

The end-capping agents utilized in the formation of the terminal groups of Formula I may be represented by the general formula

II.

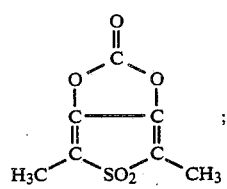

wherein R and R¹ are as defined hereinafore.

Some illustrative non-limiting examples of the end-capping agents of Formula II include

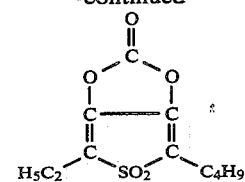

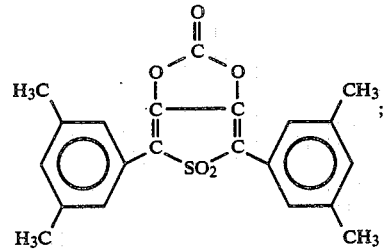

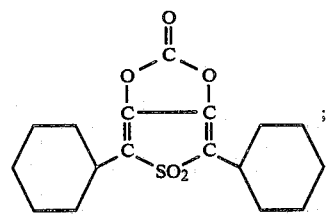

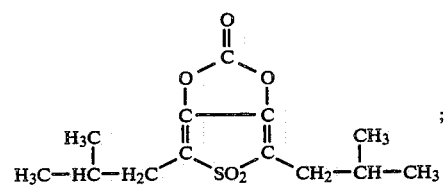

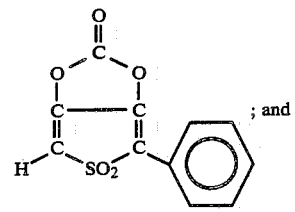

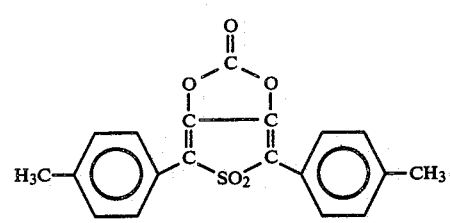

The preferred compounds of Formula II are those wherein R and R¹ are independently selected from monovalent hydrocarbon radicals. The preferred monovalent hydrocarbon radicals are selected from aryl and alkaryl radicals. The preferred aryl radical is the phenyl radical. The preferred alkaryl radicals are the alkyl, preferably lower alkyl, substituted phenyl radicals.

The compounds of Formula II are well known to those skilled in the art and are generally commercially available or may be readily prepared by known methods.

A preferred method of forming aromatic polymers containing at least one terminal group of Formula I involves performing the aromatic polymer and thereafter reacting said preformed polymer with an end-capping amount of at least one end-capping agent of Formula II. By end-capping amount is meant an amount effective to form at least one terminal group of Formula I on the terminal or end portions of the aromatic polymers. Generally, this amount is in the range of from about 50 to about 800 mole percent based on the amount of phenol end or terminal groups present in the aromatic polymer, and preferably from about 100 to about 600 mole percent.

The aromatic polymers of the instant invention include the carbonate polymers; the copolyester-carbonate polymers; the polyesters, particularly the polyarylates, the phenolics or phenol-aldehydes; and the polyphenylene ethers.

All of these aromatic polymers are well known in the art and may be prepared by known conventional processes. The polycarbonates are disclosed, inter alia, in U.S. Pat. Nos. 3,989,672, 3,275,601, and 3,028,365, and Schnell, H., Chemistry and Physics of Polycarbonates, Interscience Publishers, New York, N.Y., all of which are hereby incorporated herein by reference.

The copolyester-carbonates, as well as methods for their preparation, are disclosed, inter alia, in U.S. Pat. No. 3,169,121 and U.S. Pat. No. 4,156,069, both of which are hereby incorporated herein by reference.

The polyesters, including the polyarylates or aromatic polyesters, are disclosed in U.S. Pat. Nos. 2,720,502, 2,727,881, 3,351,624, and 3,317,464, all of which are hereby incorporated herein by reference.

The phenolic, or phenol-aldehyde resins, are disclosed in U.S. Pat. Nos. 2,540,592, 2,657,185, 4,010,163 and 4,183,841, all of which are hereby incorporated herein by reference.

The polyphenylene ether resins are disclosed, inter alia, in U.S. Pat. Nos. 3,383,435 and 3,306,874, both of which are hereby incorporated herein by reference.

The polycarbonates of the instant invention may be generally prepared by reacting a dihydric phenol with a carbonate precursor. The dihydric phenols employed in the practice of this invention are known dihydric phenols in which the sole reactive groups are the two phenolic hydroxyl groups. These dihydric phenols may be represented by the formula

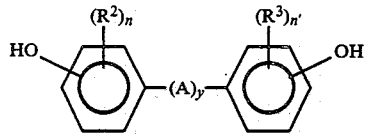

wherein:

$R^2$ is independently selected from halogen radicals and monovalent hydrocarbon radicals, $R^3$ is independently selected from halogen radicals and monovalent hydrocarbon radicals;

A is a divalent hydrocarbon radical, —S—, —S—S—,

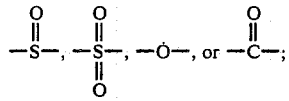

n and n' are independently selected from positive integers having a value of from 0 to 4 inclusive; and y is either zero or one.

The halogen radicals represented by $R^2$ and $R^3$ are preferably selected from chlorine and bromine.

The monovalent hydrocarbon radicals represented by $R^2$ and $R^3$ are selected from alkyl radicals, cycloalkyl radicals, aryl radicals, alkaryl radicals, and aralkyl radicals.

The alkyl radicals represented by $R^2$ and $R^3$ include the straight chain alkyl radicals and the branched alkyl radicals. The preferred alkyl radicals are those containing from 1 to about 12 carbon atoms. Some illustrative non-limiting examples of these alkyl radicals include methyl, ethyl, propeyl, isopropyl, butyl, tertiarybutyl, pentyl, neopentyl, and hexyl.

The preferred cycloalkyl radicals are those containing from 4 to about 8 ring carbon atoms. Some illustrative non-limiting examples of these cycloalkyl radicals include cyclopropyl, cyclopentyl, cyclohexyl, methylcyclohexyl, and cycloheptyl.

The preferred aryl radicals are those containing from 6 to 12 ring carbon atoms, i.e., phenyl, naphthyl, and biphenyl.

The preferred aralkyl radicals and alkaryl radicals are those containing from 7 to about 14 carbon atoms.

The divalent hydrocarbon radicals represented by A are selected from alkylene radicals, cycloalkylene radicals, alkylidene radicals, and cycloalkylidene radicals. The preferred alkylene radicals are those containing from 2 to about 10 carbon atoms. The preferred alkylidene radicals are those containing from 1 to about 10 carbon atoms. The preferred cycloalkylene radicals and cycloalkylidene radicals are those containing from 4 to about 8 ring carbon atoms.

Some illustrative non-limiting examples of dihydric phenols represented by Formula I include:
2,2-bis(4-hydroxyphenyl)propane(bisphenol-A);
2,2-bis(3,5-dimethyl-4-hydroxyphenyl)propane;
2,2-bis(3-chloro-4-hydroxyphenyl)propane;
bis(4-hydroxyphenyl)methane;
1,1-bis(4-hydroxyphenyl)cyclohexane;
1,1-bis(4-hydroxyphenyl)ethane;
4,4'-thiodiphenol;
1,3-bis(4-hydroxyphenyl)propane;
3,3-bis(4-hydroxyphenyl)pentane;
2,2-bis(3-chloror-5-methyl-4-hydroxyphenyl)propane; and
2,2-bis(3,5-dibromo-4-hydroxyphenyl)propane.

A further group of dihydric phenols outside the scope of the above generic formula which may be used in the practice of the invention includes the dihydroxy benzenes, and the halo- and alkyl substituted dihydroxy benzenes, such as, for example, resorcinol, hydroquinone, 2,4-dihydroxy-2-chlorobenzene, 1,4-dihydroxy-2-bromobenzene, 1,4-dihydroxy-2,3-dichlorobenzene, 1,4-dihydroxy-2-methylbenzene, 1,4-dihydroxy-2,3-dimethylbenzene, 1,4-dihydroxy-2-bromo-3-propylbenzene.

Other dihydric phenols of interest include the phthalein type bisphenols which are disclosed in U.S. Pat. Nos. 3,035,021; 3,036,036; 3,036,037; 3,036,038; and 3,036,039.

It is, of course, possible to employ a mixture of two or more different dihydric phenols in preparing the thermoplastic carbonate polymers of this invention.

The carbonate precursors employed in the preparation of the polycarbonates of this invention include the carbonyl halides, the bishaloformates, or diarylcarbonates, depending upon the polymerization process used to make the polycarbonates of the invention. The carbonyl halides which can be employed include carbonyl bromide, carbonyl chloride and mixtures thereof. Typical of the diaryl carbonates which may be employed are diphenyl carbonate; di(halophenyl)carbonates such as di(chlorophenyl)carbonate, di(bromophenyl)carbonate, di(trichlorophenyl)carbonate, di(tribromophenyl)carbonate, and the like; di(alkylphenyl)carbonates such as di(tolyl)carbonate, and the like; di(napthyl)carbonate, di(chloronaphthyl)carbonate, phenyl tolyl carbonate, chlorophenyl chloronaphthyl carbonate, and the like, or mixtures thereof. The bishaloformates suitable for use herein include the bishaloformates of dihydric phenols such as the bischloroformate of hydroquinone, bischloroformate of bisphenol-A, and the like; the bishaloformates of glycols such as for example bischloroformate of ethylene glycol, bischloroformate of neopentyl glycol, bischloroformate of polyethylene glycol, and the like.

It is generally preferred to form the instant polycarbonates, i.e., those having terminal groups of Formula I, by first preparing the polycarbonates and thereafter reacting the preformed carbonate polymers with the end capping compounds of Formula II. A particular useful method for preparing the carbonate polymers containing the terminal groups of the instant invention involves first preparing the carbonate polymer via a melt polymerization process involving the reaction of a dihydric phenol with a diaryl carbonate, and after the carbonate polymer is formed reacting this carbonate polymer with an end-capping amount of the end-capping agent of Formula II. The reaction of the end-capping compound of Formula II with the carbonate polymer to form polycarbonates containing terminal groups of Formula I may be conveniently accomplished by admixing an end-capping amount of the compound of Formula II with the preformed carbonate polymer and then heating the resulting mixture under conditions which are effective for the compounds of Formula II to react with the terminal hydroxyl groups of the phenolic end groups of the carbonate polymer to form the terminal groups of Formula I. Generally, these conditions involve elevated temperatures of from about 150° to about 300° C.

It is also possible to form the carbonate polymers containing the terminal group of Formula I by including an end-capping amount of the compounds of Formula II in the polycarbonate forming reaction process. Thus, for example, it is also possible to form polycarbonates containing the terminal groups of Formula I via the melt polymerization process by admixing a diaryl carbonate, a dihydric phenol, and an endcapping amount of the compound of Formula I, and thereafter heating the resulting mixture to form polycarbonates containing terminal groups of Formula I.

The carbonate polymers of the instant invention may contain only one type of terminal group of Formula I, or they may contain a mixture of two or more different terminal groups of Formula I. In order to produce polycarbonates containing only one type of terminal group of Formula I the carbonate polymer is reacted with only one compound of Formula II. In order to form carbonate polymers containing a mixture of two or more different terminal groups of Formula I a mixture of two or more different end-capping agents of Formula II are utilized. The amounts of the various different terminal groups present in the polycarbonates is dependent upon the amounts of the various end-capping agents of Formula II utilized.

It is also possible to produce polycarbonates containing prior art conventional terminal groups and terminal groups of Formula I. Such polycarbonates containing these mixed terminal groups may be formed, for example, by first forming partially end-capped polycarbonates containing conventional terminal groups, and thereafter reacting these incompletely end-capped polycarbonates with the compounds of Formula II to form polycarbonates containing both conventional terminal groups and terminal groups of Formula I. Thus, for example, a partially end-capped polycarbonate may be formed via the interfacial polymerization process by reacting a dihydric phenol, a carbonate precursor such as phosgene, and a conventional end-capping agent such as phenol, p-tertiarybutyl phenol, or Chrmoan-I. This polycarbonate may then be reacted with the end-capping agent of Formula II to form a polycarbonate containing both conventional terminal groups and the terminal groups of Formula I.

As mentioned previously the terminal groups of Formula I are formed by the coreaction of at least one compound of Formula II with the hydroxyl groups of end phenolic groups of the polycarbonate. Thus, the terminal portion of the polycarbonates of the instant invention may be represented by the general formula

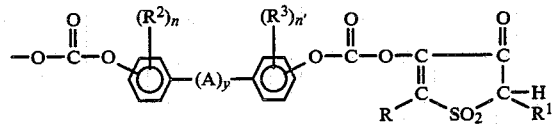

III.

wherein R, R¹, R², R³, A, n, n' and y are as defined hereinafore.

The polycarbonates of the instant invention may optionally have admixed therewith the commonly known and used additives such as inert fillers such as glass, talc, mica, and clay; impact modifiers; ultraviolet radiation absorbers such as the benzophenones, benzotriazoles, and the like; hydrolytic stabilizers such as the epoxides disclosed in U.S. Pat. Nos. 3,489,716, 4,138,379 and 3,389,247; color stabilizers such as the organophosphites; mold release agents; antioxidants; and flame retardants.

Some particularly useful flame retardants are the alkali and alkaline earth metal slats of sulfonic acids. These types of flame retardants are disclosed in U.S. Pat. Nos. 3,933,734, 3,948,851, 3,926,908, 3,919,167, 3,909,490, 3,953,396, 3,931,100, 3,978,024, 3,953,399, 3,951,910 and 3,940,366.

The high molecular weight aromatic polycarbonates prepared herein have a weight average molecular weight range of from about 10,000 to about 80,000, and preferably from about 20,000 to about 60,000.

Also included within the scope of the instant invention are the high molecular weight randomly branched aromatic polycarbonates. These randomly branched thermoplastic polycarbonates are prepared by reacting a minor amount of at least one polyfunctional organic compound with the aforedescribed dihydric phenol and the carbonate precursor. Some of the polyfunctional organic compounds useful in making the randomly branched polycarbonates are disclosed in U.S. Pat. Nos. 3,635,895, 4,001,184, 3,525,712, 3,816,373, 4,204,407 and 4,294,953.

These polyfunctional organic compounds are generally aromatic and contain at least three functional groups which may be hydroxyl, carboxyl, carboxylic anhydride, haloformyl, and mixtures thereof. Some illustrative non-limting examples of these polyfunctional organic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenontetracarboxylic acid, and the like.

Briefly stated, the high molecular weight aromatic copolyester-carbonates of this invention comprise recurring carbonate groups, carboxylate groups, and aromatic carbocyclic groups in the linear polymer chain in which at least some of the carboxylate groups and at least some of the carbonate groups are bonded directly to ring carbon atoms of the aromatic carbocyclic groups.

These copolyester-carbonates contain ester bonds and carbonate bonds in the polymer chain, wherein the amount of ester bonds is from about 25 to about 90 mole percent, preferably from about 35 to about 80 mole percent, relative to the carbonate bonds. For example, 5 moles of bisphenol-A reacting completely with 4 moles of isophthaloyl dichloride and 1 mole of phosgene would give a copolyester-carbonate of 80 mole percent ester bonds.

The copolyester-carbonates may be conveniently prepared by reacting (i) at least one ester precursor such as a difunctional carboxylic acid or, preferably, an ester forming reactive derivative thereof, (ii) at least one dihydric phenol, and (iii) a carbonate precursor.

The dihydric phenols useful in the preparation of the copolyester-carbonates of this invention are the same as those described hereinafore for the preparation of the polycarbonates. Likewise, the carbonate precursors used in the preparation of the instant copolyester-carbonates are the same as those described hereinafore.

The difunctional carboxylic acids which may be utilized in the preparation of the copolyester-carbonates are the conventional difunctional carboxylic acids used in the preparation of linear polyesters. These acids are disclosed in U.S. Pat. No. 3,169,121, which is hereby incorporated herein by reference. Particularly useful difunctional carboxylic acids are isophthalic acid, terephthalic acid, and mixtures thereof.

Rather than utilizing the difunctional carboxylic acids per se it is preferred to use the ester froming reactive derivatives thereof. Particularly useful ester forming reactive derivatives of difunctional carboxylic acids are the acid dihalides. Preferred acid dihalides are the acid dichlorides. Thus, for example, instead of using isophthalic acid, terephthalic acid, or mixtures thereof it is preferred to use isophthaloyl dichloride, terephthaloyl dichloride, and mixtures thereof.

Also included within the term copolyester-carbonates are the randomly branched thermoplastic copolyester-carbonates. These randomly branched copolyester-carbonates may be prepared by the coreaction of (i) at least one dihydric phenol, (ii) at least one ester precursor, (iii) a carbonate precursor, and (iv) a minor amount of polyfunctional organic compound of the type described hereinafore.

The polyesters, and the polyarylates in particular, may be conveniently prepared by the reaction of at least one dihydric phenol of the type described hereinafore with at least one ester precursor of the type described above. In the preparation of the polyarylates the ester precursor is an aromatic ester precursor, i.e., an aromatic dicarboxylic acid or an ester forming reactive derivative thereof.

The polyphenylene ether resins may be conveniently prepared by reacting a phenol with oxygen. The phenol reactant is generally a monohydric monocyclic phenol which contains only one hydroxy group bonded directly to the carbon atom of the carbocyclic ring structure.

The phenolic resins are conveniently prepared by the reaction of a phenol with an aldehyde. The phenolic resins may be one-stage or two-stage phenolic resins. The two-stage phenolic resins, the novolak resins, are well known and in general may be the condensation products of phenols such as phenol itself and an amount of aldehyde such as formaldehyde insufficient to cause complete crosslinking or cure, and in which an acid or basic catalyst is used to promote the reaction. The one-stage phenolic resins, the resole resins, may in general be the condensation products of a phenol such as phenol itself and an amount of aldehyde such as formaldehyde which is sufficient to cause crosslinking or cure when subjected to heat or heat and pressure.

In the practice of the instant invention it is generally preferred to first preform the polymers which contain terminal phenolic hydroxyl groups and thereafter to react these preformed resins with an end-capping or terminating amount of at least one end-capping agent of Formula II. A particularly useful method for preparing the polymers containing at least one terminal group of Formula I is to heat a mixture of the preformed polymer containing at least one terminal phenolic hydroxyl group and an end-capping amount of at least one end-capping agent of Formula II under temperatures effective for the terminal phenolic hydroxyl groups of said polymers to coreact with the end-capping agents of Formula II to form the terminal groups of Formula I. Thus, for example, one convenient method of preparing the polymers containing terminal groups of Formula I involves physically mixing or blending the polymer with the end-capping agent of Formula II and thereafter extruding this mixture.

Generally, the temperatures at which the end-capping agents of Formula II will coreact with the terminal phenolic hydroxyl groups of the polymer range from about 125° C. to about 300° C.

This process of forming polymers containing at least one terminal group of Formula I may be used with polymers which are already partially end-capped with other conventional terminal groups such as those formed by the use of conventional chain terminating or end-capping agents such as phenol. In this instance there will be formed a statistical mixture of polymers containing the conventional terminal groups and the terminal groups of Formula I. By statistical mixture is meant that some of the polymers will contain only the conventional terminal groups, some of the polymers will contain only the terminal groups of Formula I, and some of the polymers will contain a conventional terminal group and a terminal group of formula I.

DESCRIPTION OF THE PREFERRED EMBODIMENT

The following examples are set forth to further illustrate the present invention and are not to be construed as limiting the invention thereto. Unless otherwise indicated all parts and percentages are parts or percentages by weight.

The following examples illustrate conventional bisphenol-A polycarbonates which contain phenolic hydroxyl terminal groups. These examples are presented for comparative purposes only.

EXAMPLE 1

1500 grams of a bisphenol-A homopolymer which is partially end-capped with a conventional phenol end-capping agent were extruded at 260° C. The extruded material had a free hydroxyl content, as determined by IR analysis, of 380 ppm (parts per million). The Intrinsic Viscosity was 0.492 dl/gm in methylene chloride at 25° C.

EXAMPLE 2

The extruded material of Example 1 was heated at 250° C. for 16 hours. At the end of this thermal aging the material was brittle, had a free hydroxyl content of 998 ppm, and an Intrinsic Viscosity in methylene chloride at 25° C. of 0.426 dl/gm.

The following examples illustrate polycarbonates which have been end-capped with the end-capping agents of the instant invention.

EXAMPLE 3

A mixture comprising 1500 grams of bisphenol-A polycarbonate homopolymer partially end-capped with a conventional phenol end-capping agent and 8 grams of 4,6-diphenylthieno[3,4-d][1,3]dioxol-2-one 5,5-dioxide was blended and extruded at 260° C. The extruded material had a free hydroxyl content of 22 ppm and an Intrinsic Viscosity in methylene chloride at 25° C. of 0.485 dl/gm.

EXAMPLE 4

The extruded material of Example 3 was heated at 250° C. for 16 hours. At the end of the thermal aging the material remained tough, had a free hydroxyl content of 46 ppm, and had an Intrinsic Viscosity in methylene chloride at 25° C. of 0.472.

TABLE II

| Example No. | free hydroxyl content (ppm) | IV | ΔIV |
|---|---|---|---|
| 1 | 380 | 0.492 | |
| 2 | 998 | 0.426 | 0.066 |
| 3 | 22 | 0.485 | |
| 4 | 46 | 0.472 | 0.013 |

As illustrated by the data in Table II the polycarbonate of the instant invention (Example 3) has a lower hydroxyl content than the prior art conventional polycarbonate (Example 1). This is an indication that the polycarbonate of Example 3 has had some of its free hydroxyl groups replaced by the terminal group of the instant invention.

The thermal stability of the instant polycarbonates vis-a-vis the conventional prior art polycarbonates is clearly illustrated by a comparison of Examples 2 and 4. As a polycarbonate resin thermally degrades free hydroxyl groups are formed at its terminal portion. The amount of the free hydroxyl groups present in Example 4 is much lower than the amount present in Example 2. This is an indication that the polycarbonate of the instant invention is more thermally stable than the conventional prior art polycarbonate of Example 2. Furthermore, the change in Intrinsic Viscosity before and after heat aging of the prior art polycarbonate (Examples 1 and 2) is greater than the change in the polycarbonate of the instant invention (Examples 3 and 4). This is a furher indication of the greater thermal stability of the polycarbonates of the instant invention.

The invention has been described in the above specification and illustrated by reference to specific embodiments in the illustrative examples. However, it is to be understood that these embodiments are not intended to limit the invention since changes and modifications in the specific details disclosed herein can be made without departing from the scope or spirit of the invention.

What is claimed is:

1. Polycarbonate polymer having at least one terminal group represented by the general formula

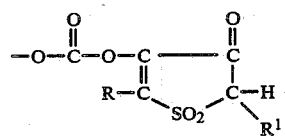

wherein R and $R^1$ are independently selected from hydrogen or monovalent hydrocarbon radicals.

2. The polymer of claim 1 wherein said monovalent hydrocarbon radicals are selected from alkyl radicals, cycloalkyl radicals, aryl radicals, aralkyl radicals, or alkaryl radicals.

3. The polymer of claim 2 wherein said monovalent hydrocarbon radicals are selected from aryl radicals or alkaryl radicals.

4. The polymer of claim 2 wherein said monovalent hydrocarbon ardicals are selected from aryl radicals.

5. The polymer of claim 4 wherein said aryl radical is the phenyl radical.

6. The polymer of claim 1 wherein R and $R^1$ are independently selected from monovalent hydrocarbon radicals.

7. The polymer of claim 6 wherein said monovalent hydrocarbon radicals are selected from alkyl radicals, cycloalkyl radicals, aryl radicals, aralkyl radicals, or alkaryl radicals.

8. The polymer of claim 7 wherein said monovalent hydrocarbon radicals are selected from aryl radicals or alkaryl radicals.

9. The polymer of claim 8 wherein said monovalent hydrocarbon radicals are selected from aryl radicals.

10. The polymer of claim 9 wherein said aryl radical is the phenyl radical.

11. The polymer of claim 1 wherein said polycarbonate is derived from at least one dihydric phenol and at least one carbonate precursor.

12. The polymer of claim 11 wherein said carbonate precursor is phosgene.

13. The polymer of claim 12 wherein said dihydric phenol is bisphenol-A.

* * * * *